March 29, 1960  O. RELLENSMANN ET AL  2,930,240
GYROSCOPIC SURVEYING COMPASS

Filed Jan. 21, 1958  3 Sheets-Sheet 1

INVENTORS:
Otto Rellensmann and
Dietrich Wartenberg
By
Patent Agent

March 29, 1960  O. RELLENSMANN ET AL  2,930,240
GYROSCOPIC SURVEYING COMPASS

Filed Jan. 21, 1958  3 Sheets-Sheet 2

INVENTORS:
Otto Rellensmann and
Dietrich Wartenberg

Patent Agent

March 29, 1960  O. RELLENSMANN ET AL  2,930,240
GYROSCOPIC SURVEYING COMPASS

Filed Jan. 21, 1958  3 Sheets-Sheet 3

INVENTORS:
Otto Rellensmann and
Dietrich Wartenberg

United States Patent Office 2,930,240
Patented Mar. 29, 1960

2,930,240

GYROSCOPIC SURVEYING COMPASS

Otto Rellensmann, Clausthal-Zellerfeld, and Dietrich Wartenberg, Bochum-Stiepel, Germany Application January 21, 1958, Serial No. 710,256

Claims priority, application Germany January 23, 1957

9 Claims. (Cl. 74—5)

This invention relates to gyroscopic surveying compasses, and it is directed in particular to apparatus, which are intended for surveying purposes in mines, and which accordingly require to be proof against firedamp, i.e., are so constructed that a heating or sparking, which is capable of bringing about the ignition of an explosive gas mixture, is unable to occur at any point.

According to the invention there is proposed a gyroscopic surveying compass, in which disadvantages of the prior art instruments of this kind are overcome by the fact that the supply of current to the hollow body carrying the gyroscope is effected by way of three resilient metal strips, which are insulated electrically one against another and are preferably surrounded by an electrically non-conductive liquid.

In consequence of the use of metallic strips transmission of the current from the current source to the stator of the gyroscope takes place practically without loss of energy, so that the electric power, and accordingly the size of the transformer, may be reduced very considerably, viz., by up to one-half or more.

As compared with known constructions the gyroscopic surveying compass according to the invention has the advantage that by elimination of the electrolytic transmission the gyroscope may be braked by direct current. Such direct current braking is necessary if, for the purpose of further simplification of the apparatus, the drive of the gyroscope is effected in single-phase fashion, wherein only two current-supply strips are required. Direct current is also used if, in accordance with the following proposals, the source of current is in the form of batteries. In addition, the graphite electrodes on the hollow body carrying the gyroscope, for example the gyroscope sphere frequently employed, and the corresponding surrounding sphere having oppositely disposed graphite electrodes may then be dispensed with.

In face of the constructions proof against firedamp as initially referred to above it is possible without difficulty, by the smaller amount of electrical energy required, to employ in place of the previously used compressed-air generator a battery and a battery-operated transformer, whereby an improved frequency constancy and complete independence from sources of energy alien to the apparatus may be obtained.

As compared with the system which is not protected against firedamp and makes use of strip suspension and supply of current by way of immersion contacts, the gyroscopic surveying compass according to the invention, apart from the advantage of being able to brake the gyroscope by direct current, which in the known case is also not possible in consequence of the electrolytic transmission of the current, furthermore provides the advantage that an apparatus is now available, which is capable of being transported, and that the metallic strips may be immersed fully in an insulating liquid, so that the apparatus is thus also safe against firedamp.

An additional safety means in this respect resides in the filling of the hollow body containing the gyroscope with helium gas in place of the imprisoned air, so that no explosive mixture of air and firedamp is able to form about the gyroscope. In association therewith there is the advantage of a reduction of the frictional losses at the rotor. A filling of highly explosive hydrogen gas employed for this latter purpose in conjunction with ships' compasses would not apply in the present case and would not be permissible. When employing hollow bodies supported buoyantly by a liquid there is also obtained the further advantage of being able to withhold explosive gas mixtures from the gyroscope by complete immersion of the hollow body in the liquid. In this case it is merely necessary to employ hollow bodies which are proof against liquid, failing which it is necessary to use gasproof bodies with their greater demands as regards material and sealing.

The supply of current with the aid of resilient strips of metal is already known per se in conjunction with electrical rotary-coil measuring apparatus. In this case, however, the unavoidable directing moment of the spiral springs employed for transmission of the current is utilised as a moment intended to maintain equilibrium with the moment exerted electromagnetically, so that an angular deflection is brought about representing a function of the electrical value to be measured.

In comparison therewith the directing moment, which is unavoidable when employing such resilient metal strips for transmission of the current, is undesirable in itself in gyroscopic surveying compasses, as the axis of the gyroscope should be set to the astronomical north direction, or should oscillate about that direction, solely under the action of the directing moment of the gyroscope.

Initially, therefore, the use of resilient metal strips for transmission of the current provides an incorrect indication. However, in conjunction with the development of the gyroscopic surveying compass according to the invention there has also been developed a method of calculation, which enables the error in indication brought about by the directing moment of the strips to be eliminated. In this way all conditions as regards use of the metallic strips for transmission of the current, unfavourable in themselves having regard to the object of the gyroscopic surveying compass, are satisfied, and upon elimination of the disadvantages above referred to a number of advantages are obtained.

In the course of these calculations the possibility was also found of adapting the vibration period to the particular conditions prevailing, and in particular of shortening the same.

Gyroscope text books contain the following formula as regards the vibration period:

$$T \approx 2\pi \sqrt{\frac{J}{M \cdot \omega_E \cdot \cos \varphi}}$$

In this formula:

$J$ = Impulse of the gyroscope about its axis of rotation.
$M$ = The moment that seeks to return the axis of the gyroscope, deflected by the earth's rotation, into the horizontal position.
$\omega_E$ = Angular speed of the earth.
$\varphi$ = Latitude.

It is to be recognised that in accordance with this formula the vibration period T depends on substance on two factors, which, if desired, may be varied. One of these is the rotary impulse J of the gyroscope, and the second the moment M.

If there is considered the manner in which the value of the moment M is made up, it will be found that on the system carrying the gyroscope two moments are effective, which seek to move the vertical axis of the system into the vertical, or the axis of the gyroscope into the horizontal, the value M accordingly comprising two part-values, viz., (1) $\qquad M_1 = G.\sin \beta.(a+b)$
(2) $\qquad M_2 = A.\sin \beta.b$ The abovestated formula in respect of the vibration period may accordingly also be written in the following way:

$$T \approx 2\pi \sqrt{\frac{J}{G.a + b(G-A).\omega_E.\cos \varphi}}$$

In this formula, in addition to the factors already indicated in the above, there are also the following:

$a=$ Metacentric height
$b=$ Distance of the point of lift from the lower clamping point of the strip
$G=$ Weight of the system (gyroscope+container+ballast)
$A=$ Buoyant force
$G-A=$ Pull of strip From this it may be deduced that it is possible to make the vibration period variable as desired if the variable values in this formula are changed.

The value $a$ representing the metacentric height is in practice only very slightly variable. On the other hand the pull of the strip $G-A$ and the distance $b$ of the point of lift from the lower point of attachment of the strip may be varied considerably, and the possibility is thus obtained of reducing or increasing the vibration period, the point of engagement of the strip on the supporting element being made adjustable in height and/or in the case of liquid-assisted supporting elements the difference between the weight and the buoyancy of the supporting element being made to be variable.

Heretofore the skilled man has encountered certain difficulties in consideration of this measure according to the invention, as up to now it has always been sought in strip-suspended surveying compasses to make the torsion moment of the supporting strip as low as possible. This was accomplished by the use of (1) A small loading of the strip of from 50 to 100 g.,
(2) An extremely thin supporting strip,
(3) A strip as long as possible, i.e., disposal of the lower connecting point of the strip within the sphere.

It having been found that it is possible to compensate by suitable method of calculation the errors in measurement resulting from increased torsion moment in consequence of considerable loading of the strip and shortening of the length of the strip, the possibility is now provided of adopting the proposal according to the invention, which enables a considerable effect to be exerted on, in particular a shortening of, the desired vibration period, and accordingly of the period of measurement.

By way of explanation there will be included in the course of the following description of a possible embodiment of the subject matter of the invention a brief reference to the method of calculation for eliminating the error in indication brought about by the directing moment of the strips.

Figure 1:
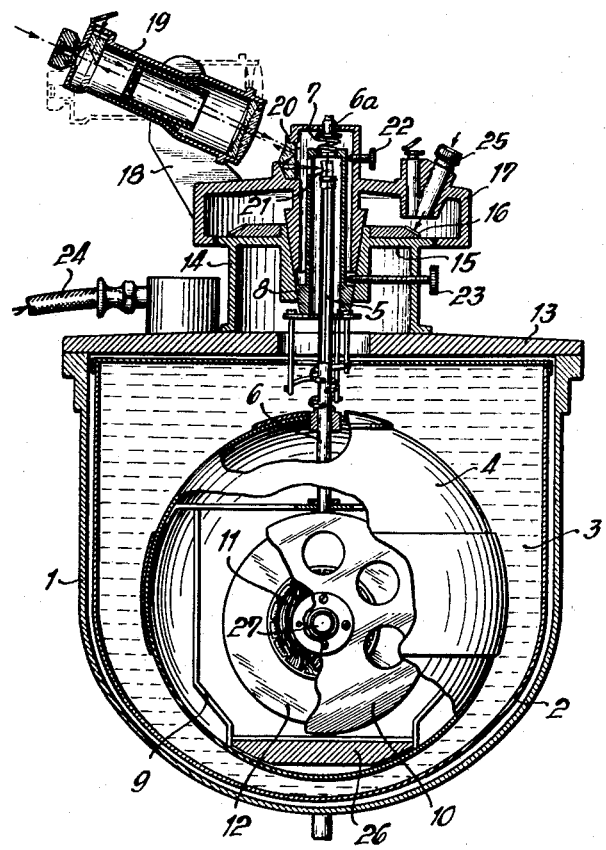
Fig. 1 is a vertical section through a diagrammatically illustrated gyroscopic surveying compass according to the invention.

In Fig. 1 there is shown at 1 a container receiving a supporting liquid, the inner wall of this container being furnished with a lining 2 for the purpose of magnetic screening of the system. Within the container 1 is provided the supporting liquid 3, in which, by means of the strip 5, there is suspended the encasing sphere 4. The strip 5 is firmly held by a clamping means 6a, which bears by way of a spring 7 against a fixed casing portion 8.

Within the spherical member 4 there is mounted with the aid of a supporting framework 9 the gyroscope system. The gyroscope system comprises a casing 10, which is mounted in the frame 9, and on which are provided in fixed relation the field windings 11. The rotor 12 is mounted to rotate about the field windings.

About the strip 5 there is disposed a hollow post 6. The hollow post is engaged by the current leads for the gyroscope system, which will be described in the following in conjunction with Fig. 2. Above the gyroscope there is provided a cover member 13, on which is mounted the casing 14. This casing carries on its upper wall 15 a graduated circle 16. Over the casing 14 there is located a second casing 17 carrying on an arm 18 a pivoted autocollimator 19. A prism is provided at 20 and a reading mirror at 21.

A screw 22 serves to hold the upper strip clamping element, which is secured against impact, in fixed relation to the graduated circle, whilst a screw 23 is provided for the purpose of fixed clamping of the apparatus. At 24 there is shown a current lead, which is more clearly recognisable in Fig. 2. A microscope for reading the gyroscope axis, and in a separate operation, the line of sight to the sighting point on the common graduated circle is shown at 25. In order to render the microscope 25 visible the position thereof in the drawing has been rocked by an angle of 90°.

A ballast weight is illustrated at 26, this weight providing for a setting of the spherical member 4 in such a manner that the axis 27 of the gyroscope is disposed horizontally.

Figure 2:
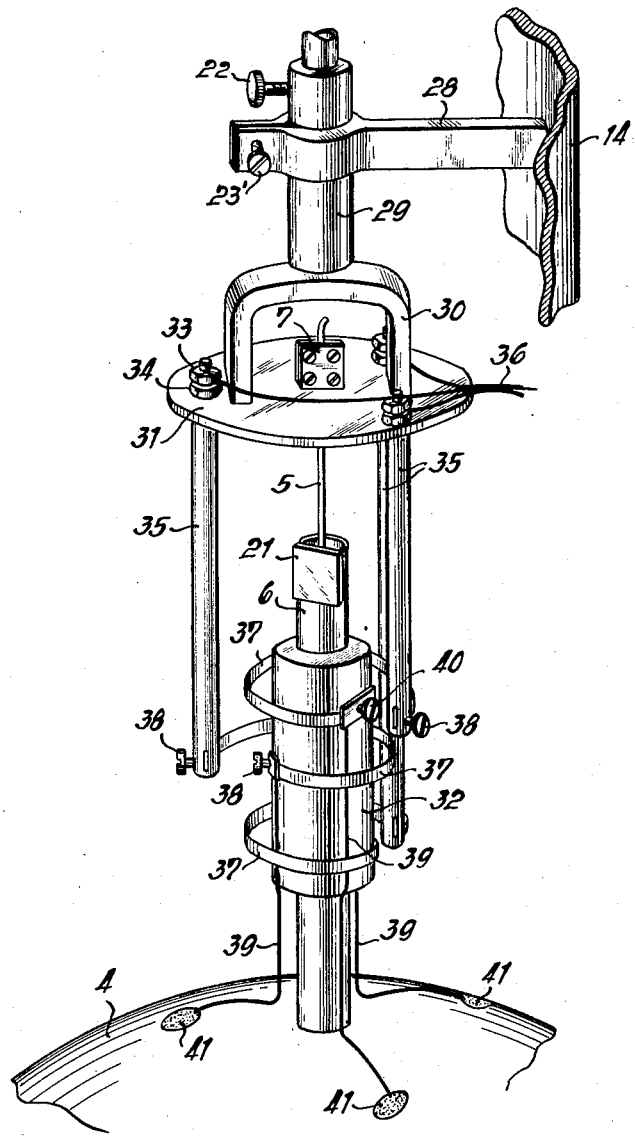
Fig. 2 is a perspective view of the resilient current transmitting elements.
Figure 2:

Fig. 2 shows in detail the current supply means in conjunction with a somewhat modified embodiment of the system. In Fig. 2 the setscrew 22 in Fig. 1 is again similarly designated, whilst the screw 23' corresponds to the screw 23 in Fig. 1. A part of the wall of the casing 14 in Fig. 1 is also indicated at 14 in Fig. 2, whilst at 28 there is shown a supporting arm rigidly connected to the said wall. At the lower end of the stub member 29 there is provided in the embodiment according to Fig. 2 a yoke piece 30, which is rigidly connected to a disc 31 composed of insulating material. On its upper face the disc 31 carries a clamping means corresponding to the clamping means 6a in Fig. 1. The suspension strip is shown at 5. As in the embodiment according to Fig. 1, there is provided at 21 the reading mirror, which is located on the hollow post 6. In the embodiment according to Fig. 2 there is also provided on the hollow post a bush 32 composed of hard rubber. As in Fig. 1, the hollow post engages through the encasing sphere 4, which is indicated diagrammatically. To the disc 31 there are secured by means of nuts 33, 34 three current-supply terminals 35. Leads 36 pass to the respective screws, whilst at the lower ends of the terminals 35 there are secured with the aid of clamping screws 38 spiral strips 37. The other ends of the spiral strips 37 are applied to the hard rubber bush 32, and are secured there together with the appertaining leads 39 by means of a clamping device 40. The wires 39 are passed through insulated and closely fitting leading-in ducts 41 into the interior of the encasing sphere 4 and are applied there to the corresponding brushes of the gyroscope system 10. In this way there may be energised the field winding 11 (Fig. 1), which causes rotation of the rotor 12. The construction of the gyroscope is known per se and does not call for further description. Generally speaking, the motor will be an asynchronous three-phase motor.

The directing moment introduced into the arrangement by the use of the resilient metal supply strips, and the error in indication thus caused, may be eliminated in the following manner. If, namely, in the case of a gyroscopic surveying compass the oscillation of the gyroscope axis is acted upon by an additional directing moment in consequence of the use of the suspension strip and the current-supply strips, the position of rest of the oscillatory movement does not coincide with the astronomical north direction, but with a direction deviating therefrom.

Figure 3:
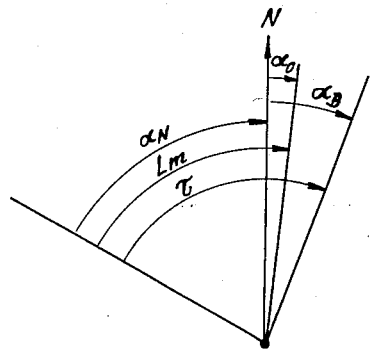
Fig. 3 is a diagram illustrating the method of eliminating the error in indication.

It may be proved mathematically and experimentally that by the use of the definitions employed in Fig. 3 this deviation amounts to $$\alpha_o = \frac{D_B}{D_{Kr}}(\alpha_B - \alpha_o)$$

In this equation:

$D_{Kr}$ = Directing moment of the gyroscope.
$D_B$ = Directing moment of the supporting strip and the current supply spirals together.
$\alpha_B$ = The direction which the axis of the non-rotating gyroscope assumes only under the action of the strip directing moment $D_B$.

The angle $\alpha_B$ is at first unknown as the north direction is also unknown. However, there may be ascertained the corresponding position $\tau$ of the direction $\alpha_B$ on the graduated circle. In addition there is obtained by medial derivation from the graduated circle readings of the reversing points of the oscillation of the gyroscope the graduated circle reading in respect of the middle position $L_m$. The difference is now $\tau - L_m = \alpha_B - \alpha_o$. The ratio $$\frac{D_B}{D_{Kr}}$$

is an apparatus constant and is determined experimentally following assembly of the apparatus. It is accordingly possible to calculate $\alpha_o$, the error in indication caused by the directing moment of the strip. There accordingly results the following graduated circle position in respect of the north direction:

$$\alpha_N = L_m - \alpha_o$$

The error in indication caused by the direction moment introduced into the apparatus by the strips is accordingly eliminated.

It is of advantage in practice if the error in indication can be made to be small and the torsion-affected position of the axis of the gyroscope is not allowed to deviate to any appreciable extent from the unaffected north position. This may be accomplished by a pre-orientation of the strip suspension means. Accordingly, in a further development of the invention, the strip suspension means is so designed that the terminals 35 (as shown in Fig. 2) and the clamping means 7 are disposed about a common supporting plate 31. The supporting plate together with the yoke piece is fixed on the extended spindle 29 of the indicator circle 16 of the theodolite 19 by means of a clamping screw 22. In this way, by rotation of the circle, there may be effected a rough setting to a certain direction or a certain graduation as a predetermined direction of orientation. Following this preliminary orientation the screw 22 is released, and in place thereof there is tightened the screw 23', which permits of rigid association of the unit comprising supporting plate 31, yoke piece 30, terminals 35, suspension strip 5 and current-supply strips 37 to the fixed supporting arm 28. Determination of the error in indication still remaining may now be effected in the manner explained, and independently thereof the theodolite may be actuated with the sighting telescope or autocollimator.

In Fig. 1 the strip suspension means as described is shown in a modified embodiment. In this construction the fixed casing portion may be coupled in fixed relation to the graduated circle by means of the setscrew 23. Since the supporting strip is extremely sensitive to impact and jolts, the clamping device 6 is mounted on the casing portion 8 by means of the spring 7.

Figure 4:
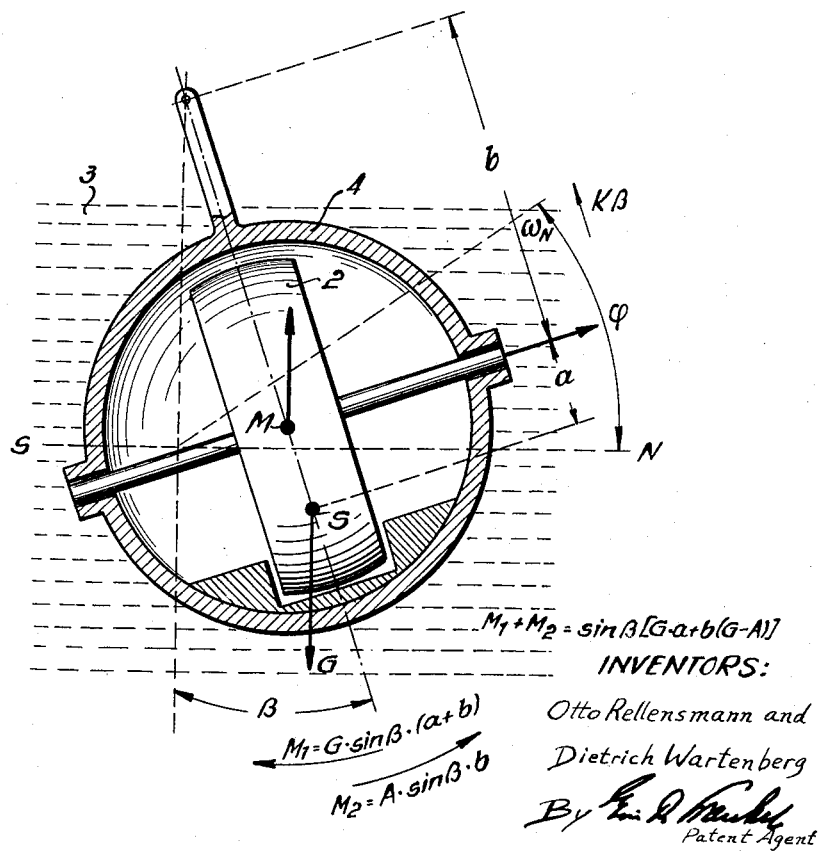
Fig. 4 is a diagrammatical view illustrating the possibility of acting on the vibration period.

In Fig. 4 there is shown diagrammatically at 4 the the encasing sphere, which receiving the gyroscope and is adapted to float in a bath of liquid 3, and which might naturally also be a cylindrical or like body. In this figure the distance of the centre M of the hollow body from the centre of gravity S is shown at $a$, whilst the distance of the centre M from the lower clamping point of the body 4 is indicated at $b$. There have also been included the values employed in the above formulae, so that further explanation would appear unnecessary.

We claim:

1. In a gyroscopic surveying compass comprising a container, liquid in said container, a gasproof hollow body adapted to be supported partially buoyantly in said liquid, a gyroscope within the said hollow body, electrical means to drive the said gyroscope, a suspension strip connecting the said hollow body to a part of the said container outside of the said hollow body to take up the residual weight of the said hollow body unsupported by the said liquid, an electric current source, and resilient strips for supplying current from the said current source to the said driving means.

2. In a gyroscopic surveying compass comprising a container, liquid in said container, a gasproof hollow body adapted to be supported partially buoyantly in said liquid, a gyroscope within the said hollow body, electrical means to drive the said gyroscope, a suspension strip connecting the said hollow body to a part of the said container outside of the said hollow body to take up the residual weight of the said hollow body unsupported by the said liquid, an electric current source, a hollow post surrounding the said suspension strip, and resilient strips for supplying current from the said current source to the said driving means and engaging the said hollow post.

3. In a gyroscopic surveying compass comprising a container, liquid in said container, a gasproof hollow body adapted to be supported partially buoyantly in said liquid, a gyroscope within the said hollow body, electrical means to drive the said gyroscope, and a suspension strip connecting the said hollow body to a part of the said container outside of the said hollow body to take up the residual weight of the said hollow body unsupported by the said liquid, an electric current source, a hollow post surrounding the said suspension strip, and spiral resilient strips surrounding the said post for supplying current from the said current source to the said driving means.

4. In a gyroscopic surveying compass comprising a container, liquid in said container, a gasproof hollow body adapted to be supported partially buoyantly in said liquid, a gyroscope within the said hollow body, electrical means to drive the said gyroscope, a suspension strip connecting the said hollow body to a part of the said container outside of the said hollow body to take up the residual weight of the said hollow body unsupported by the said liquid, an electric current source, and resilient metallic strips for supplying current from the said current source to the said driving means, said metallic strips having a form such as to have directive and attenuating forces which are negligible as compared with the directing moment of the gyroscope.

5. In a gyroscopic surveying compass comprising a container, liquid in said container, a gasproof hollow body adapted to be supported partially buoyantly in said liquid, a gyroscope within the said hollow body, electrical means to drive the said gyroscope, a suspension strip connecting the said hollow body to a part of the said container outside of the said hollow body to take up the residual weight of the said hollow body unsupported by the said liquid, an electric current source, resilient strips for supplying current from the said current source to the said driving means, and means for clamping the said suspension strip and the said current-supply strips in common to a fixed part of said container.

6. In a gyroscopic surveying compass according to claim 5, resilient means disposed between said clamping means and said fixed part of said container.

7. In a gyroscopic surveying compass comprising a gasproof hollow body adapted to be supported buoyantly in a liquid, a gyroscope within the said hollow body, electrical means to drive the said gyroscope, and a suspension strip connecting the said hollow body to a part of the said compass outside of the said hollow body to take up the residual weight of the said hollow body unsupported by the said liquid, the point of engagement of said suspension strip with said hollow body being adjustable in height, an electric current source, and resilient metal strips for supplying current from the said current source to the said driving means.

8. In a gyroscopic surveying compass comprising a gasproof hollow body adapted to be supported buoyantly in a liquid, a gyroscope within the said hollow body, electrical means to drive the said gyroscope, and a suspension strip connecting the said hollow body to a part of the said compass outside of the said hollow body to take up the residual weight of the said hollow body unsupported by the said liquid, the difference between the weight of said hollow body and the buoyant lift thereof in the said liquid variable, an electric current source, and resilient metal strips for supplying current from the said current source to the said driving means.

9. A gyroscopic surveying compass according to claim 1, in which the said hollow body is filled with helium gas.

References Cited in the file of this patent

UNITED STATES PATENTS

| | | |
|---|---|---|
| 1,180,815 | Kaempfe | Apr. 25, 1916 |
| 1,255,480 | Sperry | Feb. 5, 1918 |
| 1,501,886 | Abbot | July 15, 1924 |
| 1,743,533 | Davis | Jan. 14, 1930 |
| 1,924,816 | Sperry | Aug. 29, 1933 |
| 2,209,735 | Lauck | July 30, 1940 |